(12) United States Patent
Cao et al.

(10) Patent No.: US 11,572,279 B2
(45) Date of Patent: Feb. 7, 2023

(54) TWO-DIMENSIONAL MATERIAL NANOSHEETS WITH LARGE AREA AND CONTROLLABLE THICKNESS AND GENERAL PREPARATION METHOD THEREFOR

(71) Applicant: DALIAN UNIVERSITY OF TECHNOLOGY, Dalian (CN)

(72) Inventors: Tun Cao, Dalian (CN); Jingyuan Jia, Dalian (CN); Xinyue Zhang, Dalian (CN); Meng Lian, Dalian (CN); Ying Su, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/752,303

(22) Filed: May 24, 2022

(65) Prior Publication Data

US 2022/0380219 A1    Dec. 1, 2022

(30) Foreign Application Priority Data

Jun. 1, 2021    (CN) .......................... 202110607146.2

(51) Int. Cl.
| | |
|---|---|
| *C01B 32/186* | (2017.01) |
| *B05D 1/00* | (2006.01) |
| *B05D 3/06* | (2006.01) |
| *C01B 25/02* | (2006.01) |
| *B82Y 40/00* | (2011.01) |

(Continued)

(52) U.S. Cl.
CPC ............ *C01B 32/186* (2017.08); *B05D 1/005* (2013.01); *B05D 3/06* (2013.01); *C01B 25/02* (2013.01); *C01G 39/06* (2013.01); *B82Y 30/00* (2013.01); *B82Y 40/00* (2013.01);

(Continued)

(58) Field of Classification Search
CPC .......... B05D 1/005; B05D 3/06; B82Y 40/00; C01B 32/186; C01P 2002/82; C01P 2004/24
See application file for complete search history.

(56) References Cited

U.S. PATENT DOCUMENTS 9,807,878 B2 * 10/2017 Tatami .................. H05K 3/027

FOREIGN PATENT DOCUMENTS

| CN | 101139090 A | 3/2008 |
|---|---|---|
| CN | 107964680 A | 4/2018 |

* cited by examiner

*Primary Examiner* — Michael P Wieczorek
(74) *Attorney, Agent, or Firm* — Muncy, Geissler, Olds & Lowe, P.C.

(57) ABSTRACT

The present invention provides a two-dimensional material nanosheets with a large area and a controllable thickness and a general preparation method therefor. As an intralayer heat transfer coefficient of a two-dimensional material is much higher than an interlayer heat transfer coefficient thereof, the two-dimensional material is uniformly heated and sublimated layer by layer by controlling the energy of the laser pulses, a thinning thickness is controlled by adjusting the action time of the laser pulses, and finally, a two-dimensional material film with a controllable thickness is obtained. At the same time, a sample displacement stage moving freely in a two-dimensional plane space can realize preparation of the two-dimensional material film with a large area. Compared with traditional methods, the present invention can control a sample thickness of the two-dimensional material film, has a high generality, and is suitable for all kinds two-dimensional materials.

6 Claims, 5 Drawing Sheets

(51) Int. Cl.
*C01G 39/06* (2006.01)
*B82Y 30/00* (2011.01)

(52) U.S. Cl.
CPC ...... *C01P 2002/82* (2013.01); *C01P 2004/02* (2013.01); *C01P 2004/04* (2013.01); *C01P 2004/24* (2013.01)

TWO-DIMENSIONAL MATERIAL NANOSHEETS WITH LARGE AREA AND CONTROLLABLE THICKNESS AND GENERAL PREPARATION METHOD THEREFOR

TECHNICAL FIELD

The present invention belongs to the technical field of two-dimensional nanomaterial, and relates to two-dimensional material nano film with a large area and a controllable thickness and a general preparation method therefor, which can be applied to the field of two-dimensional material preparation/processing.

BACKGROUND

In recent years, two-dimensional materials represented by graphene have made a huge splash in materials science, and two-dimensional structures thereof have brought special performances to the materials. Two-dimensional material is a material bound by an interlayer van der Waals force, and therefore can be thinned, even to a single layer, by simple mechanical exfoliation. The two-dimensional materials exhibit different optical, electrical and magnetic properties due to difference in number of layers thereof. For example, single-layer graphene is a zero-bandgap semiconductor, while bilayer graphene is a metal; half-integer quantum Hall effect can be observed in single-layer graphene, but cannot be observed in bilayer graphene; $MoS_2$ layers with different thicknesses can be used to adjust detection of light with different wavelengths, wherein single-layer $MoS_2$ and bilayer $MoS_2$ are proved to be effective for detecting green light, while three-layer $MoS_2$ is suitable for detecting red light; $PtS_2$ has the properties of a semiconductor when the thickness is within 5 layers, and has the properties of a metal when the thickness is more than 5 layers; therefore, materials can be modified by using two-dimensional materials with different thicknesses, which provides a basis for broader research and application and is expected to lead an industrial revolution based on material innovation.

However, preparation technology of the two-dimensional materials with different thicknesses still faces a lot of challenges. First, although most two-dimensional layered materials can be obtained by mechanical exfoliation method, the thickness cannot be controlled by this method and transverse size of a sample is relatively small. Large-area graphene and some transition metal chalcogenides can be prepared by other methods such as liquid phase exfoliation or chemical vapor deposition, but the thickness of the sample is still difficult to control, and these methods are not universal, which requires further optimization in the preparation of new two-dimensional materials. Therefore, in order to realize the wide application of the two-dimensional materials, preparation with a controllable thickness is a premise, which involves professional equipment for the preparation of the two-dimensional materials and preparation technology developed on the basis of the professional equipment.

Existing preparation methods for two-dimensional layered material films have the disadvantages of difficulty in material thickness controlling, small area and poor applicability, which seriously restrict the practical application thereof. In order to avoid the disadvantages of the existing two-dimensional material preparation technology, the present invention provides a general preparation method for a two-dimensional layered material film with a large area and a controllable thickness, which is to use high-energy nanosecond laser pulses to heat and sublimate a layered sample protected by a polymethyl methacrylate (PMMA) coating, and by adjust laser power, pulse time and pulse number to change the temperature applied to a material. When the applied temperature reaches the sublimation temperature of the material by intralayer conduction, thinning effect of one layer can be achieved; when a top layer of material is sublimated, a second layer of material begins to be sublimated; thinning thickness of the material is controlled by adjusting the pulse time and the pulse number. This method can quickly realize the large-scale preparation of a two-dimensional layered material film with a controllable thickness, and has the advantages of simplified operation and high production efficiency.

Intralayer heat transfer coefficient of a two-dimensional material is: 0.1-2 W/cm·K. Interlayer heat transfer coefficient of the two-dimensional material is: 0.01-0.2 W/cm·K. For the same two-dimensional material, the intralayer heat transfer coefficient is about 10 times higher than the interlayer heat transfer coefficient. Therefore, heat generated on the sample when irradiated by a laser device tends to be released from intralayer to interlayer, an energy gradient generated makes the sample sublimated layer by layer, thus the number of layers is reduced. For the same two-dimensional material, the thickness of each layer is same, so the thickness of material is reduced as the number of layers is reduced.

SUMMARY

In view of the problems in the prior technology, the present invention provides a new general preparation method for a two-dimensional material nanosheets with a large area and a controllable thickness. The present invention takes advantage of a great difference (about 10 times) between intralayer and interlayer heat transfer coefficients of a two-dimensional material to obtain an appropriate pulse laser energy condition for preparing a two-dimensional material film with a large area and a controllable thickness, and achieve an effect that the thinning material thickness can be controlled with the increase of laser pulse number, i.e., the larger the laser pulse number is, the thinner the material gets.

To achieve the above purpose, the present invention provides the following technical solution:

A two-dimensional material nanosheets with a large area and a controllable thickness, the two-dimensional material nanosheet is single-layer or multilayer, and size of a sample can reach 10 cm.

The two-dimensional materials include but not limited to: graphene; hexagonal boron nitride; black phosphorus; molybdenum disulfide and other transition metal dichalcogenides (semiconductive $MoS_2$, $WS_2$, $WSe_2$, $NbSe_2$, $ZrS_2$ and $ZrSe_2$; metallic $NbS_2$, $TiS_2$, $TaS_2$, $NiSe_2$ and $NbSe_2$); transition metal trichalcogenides ($NbX_3$, $TiX_3$ and $TaX_3$, where X=S, Se and Te; metal phosphorus trichalcogenides, such as $MnPS_3$, $CdPS_3$, $NiPS_3$ and $ZnPS_3$); metal halides ($PbI_2$, $BiI_3$, $MoCl_2$, $PbCl_4$); layered oxides ($Bi_2Sr_2CaCu_2O_xSr_2Nb_3O_{10}$, $TiO_2$, $Ti_3O_7$, $MnO_2$, $MoO_3$, $WO_3$, $V_2O_5$, perovskite structures $LaNbO_7$, $Bi_4Ti_3O_{12}$, etc.); transition metal halides (VOCl, CdOCl, FeOCl, $NbO_2F$, $WO_2Cl_2$, etc.); layered hydroxides ($Ni(OH)_2$, $Eu(OH)_2$, etc.); layered metasilicates ($[(Mg_3)(Si_2O_5)_2(OH)_2]$, $[(Al_2)(Si_3Al)O_{10}(OH)_2]K$, $[(Al_2)(Si_2Al_2)O_{10}(OH)_2]Ca$; $[(Mg_6)(Si_6Al_2)O_{20}(OH)_4]$, $[(MgFe)_3(Si_3Al)O_{10}(OH)_2]K$, $[Mg_{11/4}(Si_6Al_2)O_{20}F_4]\text{-}[(M^2+)_{3/2}])$; metal carbides and nitrides (MAX, where M=transition metal, A=Al and Si, and X=C or N; $WC_2$); other layered semiconductors (GaSe, GaTe, InSe, GeS, $In_2Se_3$, $Bi_2Se_3$, etc.); etc. Graphite, hexagonal boron nitride, black phosphorus and molybdenum disulfide are preferred.

Figure 1:
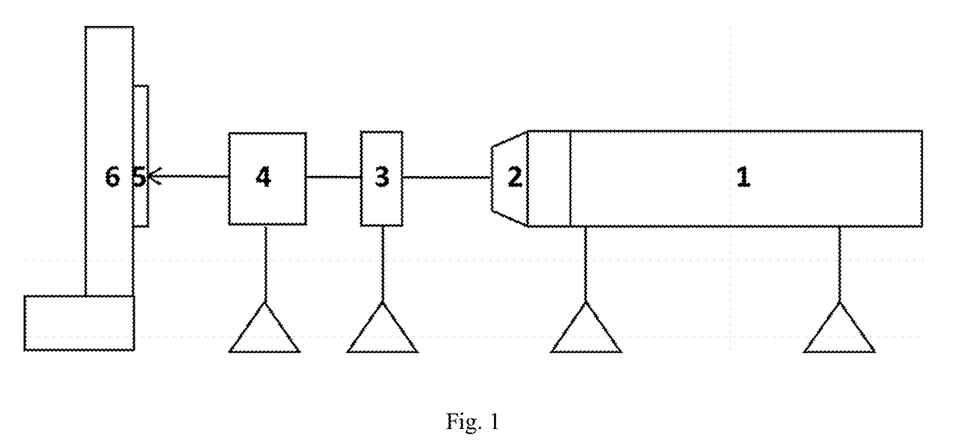
FIG. 1 is a structural schematic diagram of a high-energy nanosecond laser pulse device.
Figure 2:
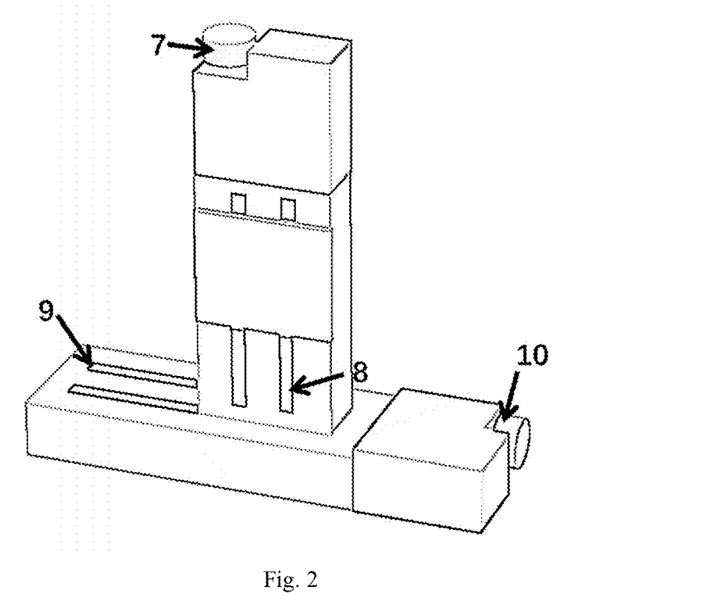
FIG. 2 is a structural schematic diagram of a displacement stage.

A general preparation method for a two-dimensional material nanosheets with a large area and a controllable thickness, comprising a step of preparing a two-dimensional material films and a step of performing heating and sublimation by high energy laser pulses, and specifically comprising the following steps:

1) Obtaining a multilayer two-dimensional material film on a $SiO_2$ substrate by methods such as physical vapor deposition or chemical vapor deposition, wherein each layer has a uniform and identical thickness;

2) Coating a polymethyl methacrylate (PMMA) film on the surface of the two-dimensional material film by a spin-coating method;

3) Heating and curing the PMMA film obtained by spin coating, with a heating condition being: 90° C.-110° C. for 1-3 minutes;

4) Fixing a two-dimensional material sample coated with the PMMA film and adhered to the $SiO_2$ substrate on a sample stage 5 of a nanosecond laser, wherein the sample stage 5 is connected with a displacement stage 6, the displacement stage can move in both directions of the XZ axis, the moving accuracy is on the order of 10 microns, and the maximum moving distances are: 10 cm and 10 cm;

5) Using a high-energy nanosecond laser pulse device to provide Gaussian laser pulses with a laser wavelength of 532 nm and a spot diameter of 1 cm to heat and sublimate the sample on the sample stage; and controlling the displacement stage 6 to move in both directions of the XZ axis to make the action area of the laser gradually cover the whole substrate.

The high-energy nanosecond laser pulse device comprises the high-energy nanosecond laser 1, a frequency doubler 2, an attenuator 3, a beam splitter 4, the sample stage 5 and the displacement stage 6; nanosecond laser pulses with a wavelength of 1064 nm are emitted by the nanosecond laser 1, the time of one pulse is 1 ns-10 ns, and the pulse number is 1-25; the wavelength of the nanosecond laser pulses is adjusted to 532 nm after passing through the frequency doubler 2, then the energy of the nanosecond laser pulses is attenuated to a required power range of 10 mJ-25 mJ after passing through the attenuator 3, the nanosecond laser pulses are irradiated to the sample stage 5 by the beam splitter 4 used in conjunction with the attenuator, and the position of the sample stage 5 is adjusted by the displacement stage 6.

Figure 3:
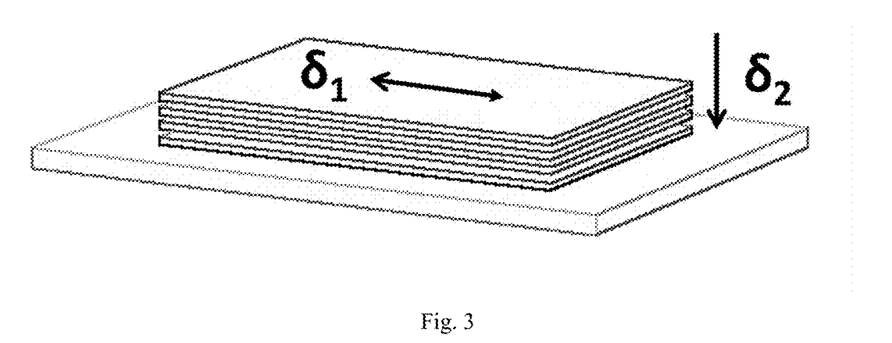
FIG. 3 is a schematic diagram of a principle for preparing a two-dimensional material nano film with a controllable thickness.

Different two-dimensional materials are heated and sublimated by adjusting pulse energy and pulse number; as the intralayer heat transfer coefficient of a two-dimensional material is about 10 times higher than the interlayer heat transfer coefficient thereof, the two-dimensional materials are sublimated (thinned) layer by layer from the surface. By controlling laser pulse number, the number of layers being thinned is increased, and the thickness of the materials is reduced. By adjusting the laser pulse number, the number of material layers being sublimated is controlled; as the thickness of each layer of the same material is the same, the thickness of the material is determined by the number of layers, and therefore an effect of a controllable thickness is achieved. During laser sublimation, the position of the sample stage 5 is adjusted to make the laser applied to an area of 10 cm*10 cm, so as to achieve an effect of sample thinning with a large area.

6) Immersing the sample in acetone for 1-2 hours to remove the PMMA on the surface and prepare a two-dimensional material film with a large area and a uniform thickness.

Preferably, in step 1), the two-dimensional material film prepared by physical vapor deposition (PVD) or chemical vapor deposition (CVD) has multiple layers and has a thickness uniformity of ±5%;

Preferably, in step 1), the substrate is the polycrystalline silicon substrate with a $SiO_2$ layer thickness of 285 nm and a total thickness of 500 nm;

Preferably, in step 2), PMMA is A4 950, the spin-coating condition is: 400-800 RPM for 5-10 seconds and 3000-4000 RPM for 20-40 seconds, and the thickness of the PMMA layer obtained by spin coating is 200-400 nm.

Preferably, in step 5), after laser heating treatment at one position, the position of the sample is continually adjusted by the displacement stage to continue laser treatment and obtain the two-dimensional material film with a size of 10 cm with uniform and controllable thickness.

Further, in step 5), the displacement stage 6 comprises an x-axis displacement stage and a z-axis displacement stage, the x-axis displacement stage is provided with an x-axis guide rail 9 and an x-axis displacement knob 10, the z-axis displacement stage is provided with a z-axis guide rail 8, a z-axis displacement knob 7 and an object stage 11, the z-axis and x-axis displacement knobs are used to manually adjust the position of the sample stage 5 in the vertical direction and the horizontal direction respectively, and the z-axis and x-axis guide rails play a role of assisting the sample stage to move electrically or manually. The object stage 11 can be controlled by the z-axis displacement knob 7 to move on the z-axis guide rail 8 along the vertical direction, and the sample stage 5 is installed on the object stage 11; the z-axis displacement stage can be controlled by the x-axis displacement knob 10 to move on the x-axis guide rail 9 along the horizontal direction. The displacement stage 6 is used in conjunction with the sample stage 5, the position of the sample stage 5 is adjusted electrically or manually by the displacement stage 6, and the maximum moving distances can reach 10 cm.

Compared with the prior art, the present invention has the following beneficial effects:

(1) The two-dimensional material film with nanometer thickness has excellent photoelectric properties and can be directly applied to the development of photoelectric sensors, and good advantages are shown in the applications of nano-sensors and nano-optoelectronic devices.

(2) The thickness adjustment range of the two-dimensional material nano film with a large area and a controllable thickness prepared by the present invention is from a single layer to hundreds of layers, the adjustment range is large and the thickness uniformity is high;

(3) The present invention proposes a general preparation method for a two-dimensional material nano film with a large area and a controllable thickness, which is suitable for two-dimensional materials such as graphene, hexagonal boron nitride, black phosphorus, and transition metal sulfides (oxides, carbides, nitrides);

(4) Using a PMMA film coating, the heating effect is uniform, and high temperature oxidation of material surface and thickness non-uniformity are avoided.

In the figures: 1 high-energy laser; 2 frequency doubler; 3 attenuator; 4 beam splitter; 5 sample stage; 6 displacement stage; 7 z-axis displacement knob; 8 z-axis guide rail; 9 x-axis guide rail; 10 x-axis displacement knob; 11 object stage.

DETAILED DESCRIPTION

The present invention is further described below in combination with drawings and embodiments. However, the present invention is not limited to the following embodiments, and shall include all contents of the claims.

Embodiment 1

A preparation method for a graphene film with a size of 10 cm and a controllable thickness of 1-100 layers, which is described in detail in accordance with a preferred embodiment:

1) Preparing a 100-layer graphene film, comprising the following steps:

Growing graphene with a large area and a thickness of 100 layers by a CVD material growing process. A substrate material used is a nickel foil with a thickness of 300 nm, the nickel foil is placed in dilute nitric acid to be corroded for 15 minutes, washed, and blow-dried with nitrogen; then the nickel foil is immediately placed into a CVD chamber, and the chamber is vacuumed to 500 mTorr.

The growing temperature is 1000° C., the raw material is a mixture of methane and hydrogen with gas flows of 35 sccm and 2 sccm respectively, and graphene with a large area (10 cm*10 cm), a clean surface and a thickness of 100 layers is obtained by growing.

Preparing a 4-inch $SiO_2$ substrate; ultrasonic cleaning the $SiO_2$ substrate with acetone, isopropyl alcohol and deionized water for 15 minutes successively, and blow-drying the $SiO_2$ substrate for later use; transferring the graphene to a $SiO_2$ surface by a film wet transfer technology, and airing the graphene in a fume hood for two hours to make the graphene adhere tightly to the $SiO_2$ surface; spin-coating PMMA onto the surface of the graphene material by a spin coater, with the spin-coating condition being: 400 RPM for 8 seconds and 3000 RPM for 20 seconds; heating and curing the PMMA film obtained by spin coating, with a heating condition being: 90° C. for 2 minutes, and forming a uniform PMMA thin layer with a thickness of 400 nm on the surface of a graphene sample.

2) Preparing a graphene film with a controllable thickness by a heating and sublimating method using a high-energy nanosecond laser pulse device, comprising the following steps:

Clamping the graphene sample with a PMMA coating on a 4-inch $SiO_2$ substrate onto a sample stage, and connecting the sample stage with a displacement stage; setting the wavelength of a nanosecond laser pulse laser to 532 nm, setting the pulse energy to 10 mJ, setting the duration of one laser pulse to 1 ns, and setting the action area of a laser spot on the graphene sample to be a circle with a diameter of 1 cm. When one pulse is applied, the number of layers of the graphene is reduced from 100 to 95; by increasing pulse number, the number of layers of the graphene is reduced linearly; and when the pulse number exceeds 20, only a single-layer graphene film is left on the $SiO_2$ substrate. This is because the heat transfer coefficient of the $SiO_2$ substrate is much higher than the interlayer heat transfer coefficient of the graphene material. Therefore, heat of laser pulses is transferred to the $SiO_2$ substrate by a single layer of graphene, and the single layer of graphene will not be sublimated due to insufficient temperature.

3) Preparing a graphene film with a size of tens of centimeters and a controllable thickness by a sample displacement stage, comprising the following steps:

Controlling the displacement stage to move in both directions of the XZ axis to make the action area of the laser gradually cover the whole 4-inch substrate; removing the treated sample, and immersing the sample in acetone for 1 hour to remove the PMMA on the surface and prepare a two-dimensional graphene film with a large area and a uniform thickness. The size of the two-dimensional graphene film prepared in the embodiment is 10 cm, and the number of layers is continually controllable from 1 to 100.

Figure 4:
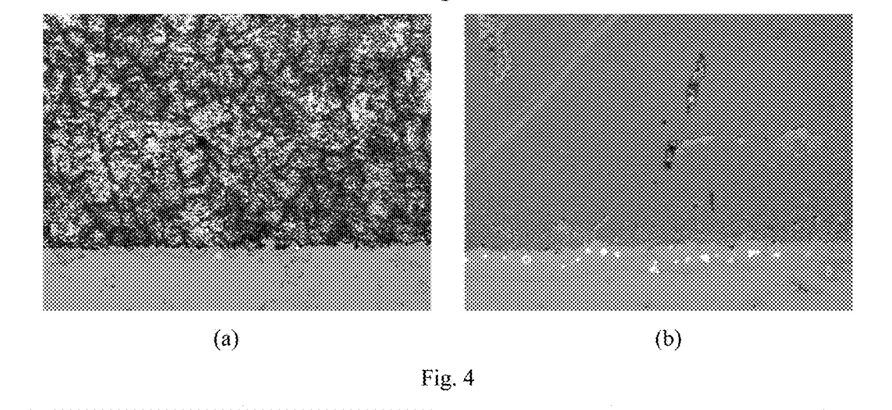
FIG. 4 shows optical micrographs of a graphene film before and after treatment with a 10 mJ high-energy nanosecond laser pulse device for 20 times in embodiment 1. (a) is an optical micrograph of a graphene sample before laser treatment, and (b) is an optical micrograph of the graphene sample after laser treatment.

FIG. 4 shows optical micrographs of a graphene film before and after treatment with a high-energy nanosecond laser pulse device in the experiment. In which, FIG. 4(a) is an optical micrograph of a graphene film sample before laser treatment, and FIG. 4(b) is an optical micrograph of the graphene film sample after laser treatment.

Figure 5:
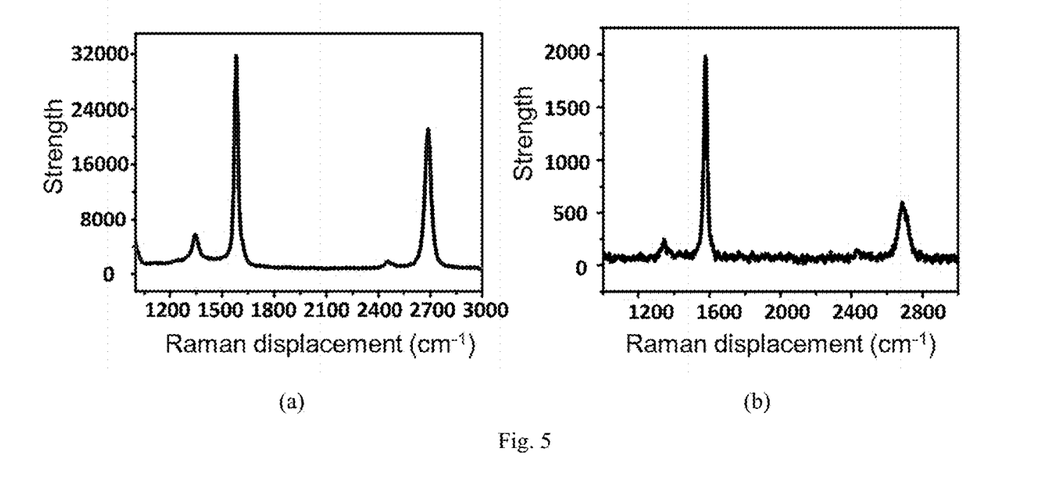
FIG. 5 shows Raman spectrograms of a graphene film before and after treatment with a 10 mJ high-energy nanosecond laser pulse device for 20 times in embodiment 1. (a) is a Raman spectrogram of a graphene sample before laser treatment, and (b) is a Raman spectrogram of the graphene sample after laser treatment.

FIG. 5 shows Raman spectrograms of a graphene film before and after treatment with a high-energy nanosecond laser pulse device in the experiment. In which, FIG. 5(a) is an Raman spectrogram of a graphene film sample before laser treatment, and FIG. 5(b) is an Raman spectrogram of the graphene film sample after laser treatment.

Embodiment 2

A preparation method for a molybdenum disulfide film with a size of 10 cm and a controllable thickness of 1-50 layers, which is described in detail in accordance with a preferred embodiment:

1) Preparing a 50-layer molybdenum disulfide film, comprising the following steps:

Growing a molybdenum disulfide film with a large area and a thickness of 50 layers by a PVD material growing process. A substrate material used is $SiO_2$, the $SiO_2$ is placed in acetone, isopropyl alcohol and deionized water in sequence for ultrasonic treatment, washed, and blow-dried with nitrogen; then the $SiO_2$ is immediately placed into a PVD chamber, and the chamber is vacuumed to 500 mTorr.

The growing temperature is 800° C., the raw material is high-purity molybdenum disulfide powder, argon is used as a carrier with a gas flow of 100 sccm, and the molybdenum disulfide film with a large area (10 cm*10 cm), a clean surface and a thickness of 50 layers is obtained by growing.

Spin-coating PMMA onto the surface of the molybdenum disulfide film by a spin coater, with the spin-coating condition being: 500 RPM for 8 seconds and 3500 RPM for 30 seconds; heating and curing the PMMA film obtained by spin coating, with a heating condition being: 90° C. for 2 minutes, and forming a uniform PMMA thin layer with a thickness of 300 nm on the surface of the molybdenum disulfide film.

2) Preparing a molybdenum disulfide film with a controllable thickness by a heating and sublimating method using a high-energy nanosecond laser pulse device, comprising the following steps:

Clamping a molybdenum disulfide sample with a PMMA coating on a 4-inch $SiO_2$ substrate onto a sample stage, and connecting the sample stage with a displacement stage; setting the wavelength of a nanosecond laser pulse laser to 532 nm, setting the pulse energy to 15 mJ, setting the duration of one laser pulse to 1 ns, and setting the action area of a laser spot on the molybdenum disulfide sample to be a circle with a diameter of 1 cm. When one pulse is applied, the number of layers of molybdenum disulfide is reduced from 50 to 48; by increasing pulse number, the number of layers of the molybdenum disulfide is reduced linearly; and when the pulse number exceeds 25, only a single-layer molybdenum disulfide film is left on the $SiO_2$ substrate. This is because the heat transfer coefficient of the $SiO_2$ substrate is much higher than the interlayer heat transfer coefficient of the molybdenum disulfide material. Therefore, heat of laser pulses is transferred to the $SiO_2$ substrate by a single layer of molybdenum disulfide, and the single layer of molybdenum disulfide will not be sublimated due to insufficient temperature.

3) Preparing a molybdenum disulfide film with a size of tens of centimeters and a controllable thickness by a sample displacement stage, comprising the following steps:

Controlling the displacement stage to move in both directions of the XZ axis to make the action area of the laser gradually cover the whole 4-inch substrate; removing the treated sample, and immersing the sample in acetone for 1 hour to remove the PMMA on the surface and prepare a two-dimensional molybdenum disulfide film with a large area and a uniform thickness. The size of the two-dimensional molybdenum disulfide film prepared in the embodiment is 10 cm, and the number of layers is continually controllable from 1 to 50.

Figure 6:
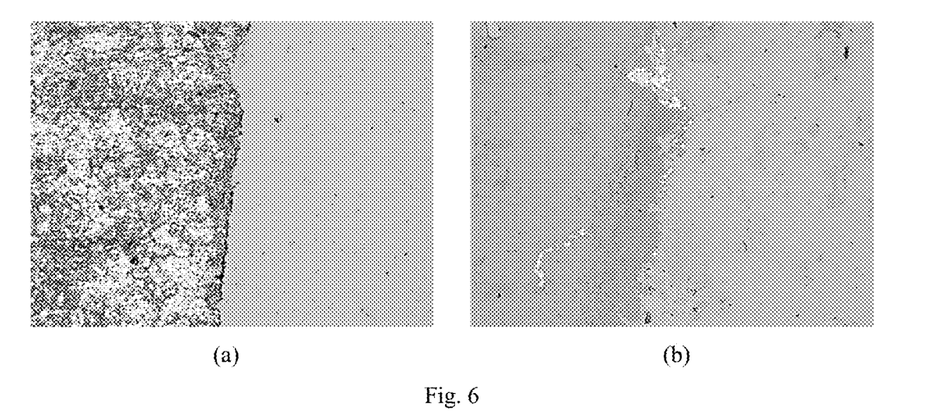
FIG. 6 shows optical micrographs of a molybdenum disulfide film before and after treatment with a 12 mJ high-energy nanosecond laser pulse device for 25 times in embodiment 2. (a) is an optical micrograph of a molybdenum disulfide sample before laser treatment, and (b) is an optical micrograph of the molybdenum disulfide sample after laser treatment.

FIG. 6 shows optical micrographs of a molybdenum disulfide film before and after treatment with a high-energy nanosecond laser pulse device for 25 times in the experiment. In which, FIG. 6(a) is an optical micrograph of a molybdenum disulfide film sample before laser treatment, and FIG. 6(b) is an optical micrograph of the molybdenum disulfide film sample after laser treatment.

Figure 7:
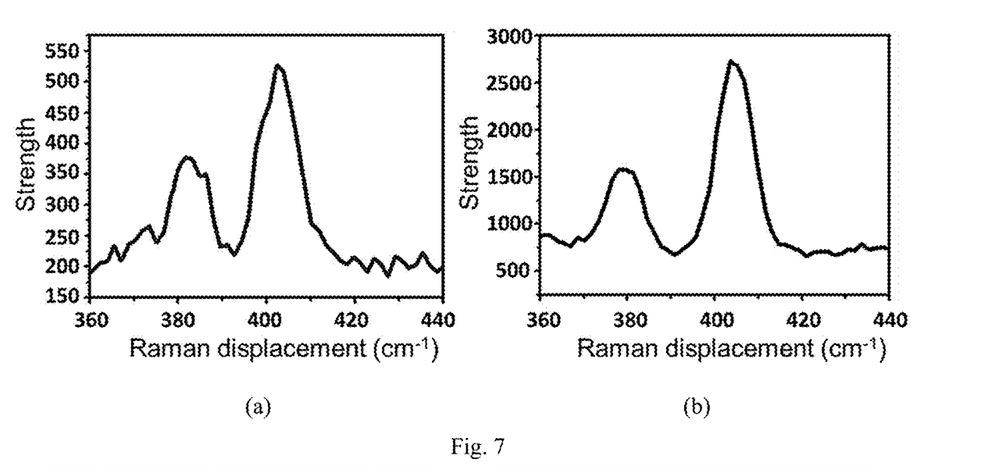
FIG. 7 shows Raman spectrograms of a molybdenum disulfide film before and after treatment with a 12 mJ high-energy nanosecond laser pulse device for 25 times in embodiment 2. (a) is a Raman spectrogram of a molybdenum disulfide sample before laser treatment, and (b) is a Raman spectrogram of the molybdenum disulfide sample after laser treatment.

FIG. 7 shows Raman spectrograms of a molybdenum disulfide film before and after treatment with a high-energy nanosecond laser pulse device for 25 times in the experiment. In which, FIG. 7(a) is a Raman spectrogram of a molybdenum disulfide film sample before laser treatment, and FIG. 7(b) is a Raman spectrogram of the molybdenum disulfide film sample after laser treatment.

Embodiment 3

A preparation method for a black phosphorus film with a size of 10 cm and a controllable thickness of 10-100 layers, which is described in detail in accordance with a preferred embodiment:

1) Preparing reactants, comprising the following steps:

Preparing a 4-inch $SiO_2$ substrate; ultrasonic cleaning the $SiO_2$ substrate with acetone, isopropyl alcohol and deionized water for 15 minutes successively, and blow-drying the $SiO_2$ substrate for later use; placing 1 mg of single crystal black phosphorus sample on an adhesive tape, and performing mechanical exfoliation by repeating folding without overlapping for 10 times; transferring a black phosphorus nano sheet obtained by mechanical stripping to the cleaned $SiO_2$ substrate; spin-coating PMMA onto the surface of the black phosphorus material by a spin coater, with the spin-coating condition being: 800 RPM for 10 seconds and 4000 RPM for 40 seconds; heating and curing the PMMA film obtained by spin coating, with a heating condition being: 90° C. for 2 minutes, and forming a uniform PMMA thin layer with a thickness of 200 nm on the surface of the black phosphorus sample.

2) Preparing a black phosphorus nanosheet by a heating and sublimating method using a high-energy nanosecond laser pulse device, comprising the following steps:

Clamping the black phosphorus sample with a PMMA coating on a 4-inch $SiO_2$ substrate onto a sample stage 5, and connecting the sample stage 5 with a displacement stage 6; setting the wavelength of a nanosecond laser pulse laser to 532 nm, setting the pulse energy to 25 mJ, setting the duration of one laser pulse to 1 ns, and setting the action area of a laser spot on the black phosphorus sample to be a circle with a diameter of 1 cm. When one pulse is applied, the number of layers of black phosphorus is reduced by 5; by increasing pulse number, the number of layers of the black phosphorus is reduced linearly; and when the pulse number exceeds 19, a 10-layer black phosphorus film with a thickness of 5 nm is left on the $SiO_2$ substrate. This is because the heat transfer coefficient of the $SiO_2$ substrate is higher than the interlayer heat transfer coefficient of the black phosphorus material. Therefore, heat of laser pulses is transferred to the $SiO_2$ substrate by 10 layers of black phosphorus, and the 10 layers of black phosphorus will not be sublimated due to insufficient temperature.

3) Preparing a black phosphorus film with a size of tens of centimeters and a controllable thickness by a sample displacement stage, comprising the following steps:

The z-axis and x-axis displacement knobs of the displacement stage 6 are used to manually adjust the position of the sample stage 5 in the vertical direction and the horizontal direction respectively, the z-axis displacement knob 7 and the x-axis displacement knob 10 are used to adjust the position of the sample stage in the vertical direction and the horizontal direction respectively, the z-axis guide rail 8 and the x-axis guide rail 9 play a role of assisting the sample stage to move, and the sample stand 5 is moved vertically and horizontally along the guide rails.

Controlling the displacement stage 6 to move in both directions of the XZ axis to make the action area of the laser gradually cover the whole 4-inch substrate; and immersing the sample in acetone for 1 hour to remove the PMMA on the surface and prepare a two-dimensional black phosphorus nanosheet with a large area and a uniform thickness. The two-dimensional black phosphorus film prepared in the embodiment has a structure of 10 layers, with a thickness of 0.5 nm for each layer, a total thickness of 5 nm and a size of 10 cm.

Figure 8:
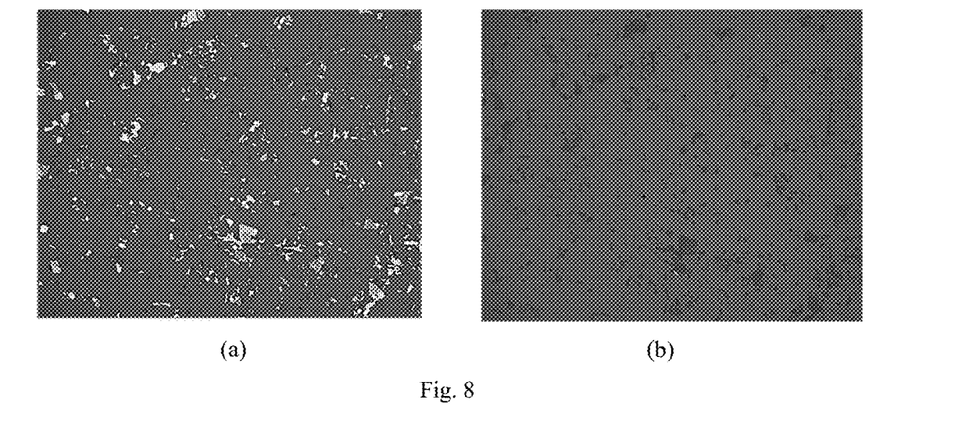
FIG. 8 shows optical micrographs of a black phosphorus nano sheet before and after treatment with a high-energy nanosecond laser pulse device in embodiment 3. In which, (a) is an optical micrograph of a black phosphorus sample before laser treatment, and (b) is an optical micrograph of the black phosphorus sample after laser treatment.

FIG. 8 shows optical micrographs of a black phosphorus film before and after treatment with a high-energy nanosecond laser pulse device in the experiment. It can be seen from the figure that the thickness of a black phosphorus sample before treatment is relatively thick, and the thickness of black phosphorus after laser treatment is significantly reduced.

Figure 9:
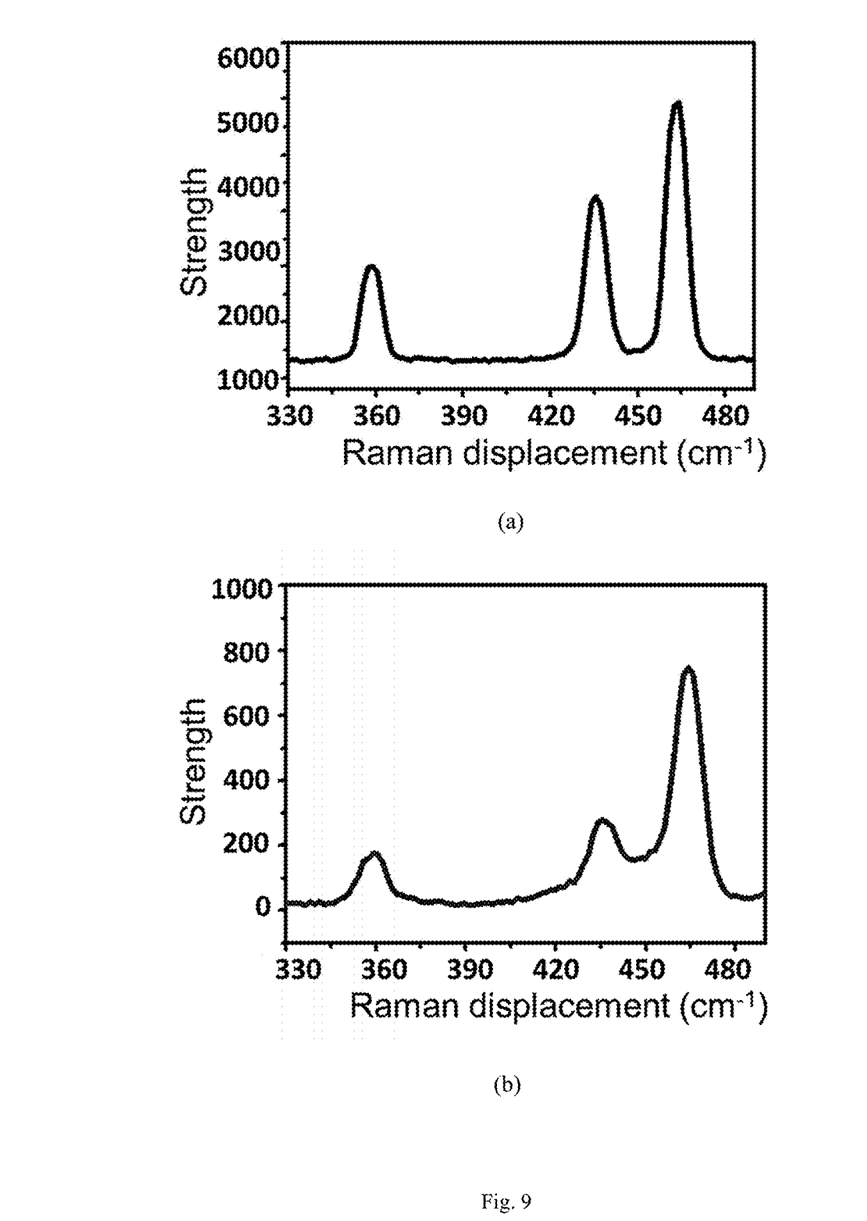
FIG. 9 shows Raman spectrograms of a black phosphorus nano sheet before and after treatment with a high-energy nanosecond laser pulse device in embodiment 3. In which, (a) is a Raman spectrogram of a black phosphorus sample before laser treatment, and (b) is a Raman spectrogram of the black phosphorus sample after laser treatment.

FIG. 9 shows Raman spectrograms of a black phosphorus film before and after treatment with a high-energy nanosecond laser pulse device in the experiment. It can be seen from the figure that each Raman spectrogram has three purity characteristic peaks; in terms of position, the purity characteristic peaks are consistent with Raman characteristic peaks of black phosphorus, which indicates that the sample contains no oxide or other impurities, and the purity is high; in terms of amplitude, the Raman peaks of the black phosphorus sample before treatment are significantly higher than those after treatment, which indicates that the thickness is significantly reduced.

Figure 10:
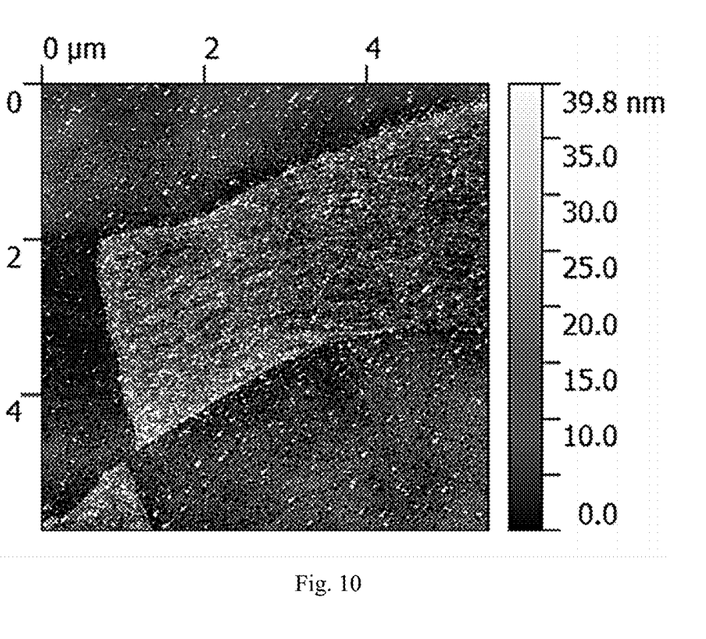
FIG. 10 is an AFM scanogram of a black phosphorus nano sheet prepared in embodiment 3.

FIG. 10 is an AFM scanogram of a black phosphorus nano sheet prepared in the experiment. It can be seen from the figure that the thickness of a sample is about 5 nm.

The above embodiments 1, 2 and 3 are typical embodiments of the present invention and do not constitute any limitation of the present invention. For example, quantity of bulk materials, laser pulse energy, laser pulse number, etc. can be further adjusted. Therefore, according to the general idea of the present invention, the adjustments and modifications of the described process parameters made by those skilled in the art shall fall into the protection scope of the present invention without departing from the conception of the present invention or going beyond the scope defined in the claims.

The invention claimed is:

1. A method for a two-dimensional material nanosheets, comprising the following steps:
   1) obtaining a multilayer two-dimensional material film on a $SiO_2$ substrate, wherein each layer has a uniform and identical thickness;
   2) coating a polymethyl methacrylate (PMMA) film on the surface of the two-dimensional material film by a spin-coating method;
   3) heating and curing the PMMA film obtained by spin coating, with a heating condition being: 90° C.-110° C. for 1-3 minutes;
   4) fixing the multilayer two-dimensional material film on a $SiO_2$ substrate coated with the PMMA film on a sample stage (5) of a nanosecond laser, wherein the sample stage (5) is connected with a displacement stage (6), the position of the sample stage (5) is adjusted by the displacement stage (6), the displacement stage can move in both directions of the XZ axis, the moving accuracy is on the order of 10 microns, and the maximum moving distances are: 10 cm and 10 cm;
   5) using the nanosecond laser pulse device to provide Gaussian laser pulses with a laser wavelength of 532 nm and a spot diameter of 1 cm to heat and sublimate the two-dimensional material film on the sample stage (5); and controlling the displacement stage (6) to move in both directions of the XZ axis to make the action area of the laser gradually cover the two-dimensional material film treated with the laser;
   different two-dimensional materials are heated and sublimated by adjusting pulse energy and pulse number, and the two-dimensional material film are sublimated and thinned layer by layer from the surface: by controlling laser pulse number, the number of layers being thinned is increased, and the thickness of the materials is reduced; and by adjusting the laser pulse number, the number of material layers being sublimated is controlled;
   the nanosecond laser pulse device comprises the nanosecond laser (1), a frequency doubler (2), an attenuator (3), a beam splitter (4), the sample stage (5) and the displacement stage (6); nanosecond laser pulses with a wavelength of 1064 nm are emitted by the nanosecond laser (1), the time of one pulse is 1 ns-10 ns, and the pulse number is 1-25; the wavelength of the nanosecond laser pulses is adjusted to 532 nm after passing through the frequency doubler (2), then the energy of the nanosecond laser pulses is attenuated to a required power range of 10 mJ-25 mJ after passing through the attenuator (3), and the nanosecond laser pulses are irradiated to the sample stage (5) by the beam splitter (4) used in conjunction with the attenuator;
   6) immersing the two-dimensional material film treated by the laser in acetone to remove the PMMA on the surface and obtain a two-dimensional material film; the two-dimensional material film is graphite, black phosphorus or molybdenum disulfide.

2. The method for a two-dimensional material nanosheets according to claim 1, wherein in step 1), the two-dimensional material film prepared by physical vapor deposition or chemical vapor deposition has a thickness uniformity of ±5%.

3. The method for a two-dimensional material nanosheets with according to claim 1, wherein in step 2), the spin-coating method is: first, spin coating at 400-800 rpm for 5-10 seconds, and then spin coating at 3000-4000 rpm for 20-40 seconds, and the thickness of the PMMA layer obtained by spin coating is 200-400 nm.

4. The method for a two-dimensional material nanosheets with according to claim 1, wherein in step 5), after laser heating treatment at one position, the position of the sample is continually adjusted by the displacement stage to continue laser treatment and obtain the two-dimensional material film with a uniform and controllable thickness.

5. The method for a two-dimensional material nanosheets with according to claim 1, wherein in step 5), the displacement stage (6) comprises an x-axis displacement stage and a z-axis displacement stage, the x-axis displacement stage is provided with an x-axis guide rail (9) and an x-axis displacement knob (10), the z-axis displacement stage is provided with a z-axis guide rail (8), a z-axis displacement knob (7) and an object stage (11), the z-axis and x-axis displacement knobs are used to manually adjust the position of the sample stage in the vertical direction and the horizontal direction respectively, and the z-axis and x-axis guide rails play a role of assisting the sample stage to move electrically or manually; the object stage (11) can be controlled by the z-axis displacement knob (7) to move on the z-axis guide rail (8) along the vertical direction, and the sample stage (5) is installed on the object stage (11); the z-axis displacement stage can be controlled by the x-axis displacement knob (10) to move on the x-axis guide rail (9) along the horizontal direction; the displacement stage (6) is used in conjunction with the sample stage (5), the position of the sample stage (5) is adjusted electrically or manually by the displacement stage (6), and the maximum moving distances can reach 10 cm.

6. The method for a two-dimensional material nanosheets with according to claim 1, wherein in step 6), the time for immersion in acetone is 1-2 hours.

\* \* \* \* \*